UNITED STATES PATENT OFFICE.

ARTHUR E. KRAUSE, OF JERSEY CITY, NEW JERSEY.

FILTER AND FILTERING PROCESS.

1,198,039.  Specification of Letters Patent.  Patented Sept. 12, 1916.

No Drawing.  Application filed August 26, 1914.  Serial No. 858,642.

*To all whom it may concern:*

Be it known that I, ARTHUR E. KRAUSE, a citizen of the United States of America, and a resident of Jersey City, in the county of Hudson and State of New Jersey, have invented certain new and useful Improvements in Filters and Filtering Processes, of which the following is a specification.

This invention relates to filters and filtering processes, and particularly to processes of filtering oil and grease from steam and from oily water such as condenser water, and to filters adapted for carrying out such process; and it comprises a filter having a filter body of a particular carbonaceous material, which I term " flue dust " because of its source, which material is made up of brittle, porous, granular and flaky carbonaceous particles intermixed with particles of silicious ash; it also comprises a composite filter having one or more layers of such carbonaceous flue dust and one or more layers of an acidity-neutralizing filtering material such as serpentine asbestos or magnesium silicate, magnesium carbonate, etc.; and, as a process, it comprises a process of separating oil and grease from oily or greasy water by filtering such water through such a filter of carbonaceous flue dust made up of the intermixed brittle, porous, granular and flaky carbonaceous particles and of ash particles; and more specifically it comprises a combined process of filtering the oily or greasy water or other liquid or liquid mixture through such a carbonaceous layer and then through a layer of such an acidity-neutralizing filtering material as that above referred to, whereby any acidity caused by the passage of the water through the carbonaceous layer is neutralized and a further filtration and purification effected; all as more fully hereinafter set forth and as claimed.

The difficulty of removing oil and grease from the oily water obtained by condensing the exhaust of steam engines is so great that many large heating and power plants make no attempt to purify and re-use this water but discharge it into the sewer with resulting loss and expense and contamination with the oil of the body of water into which discharge takes place. For, unless the oil and grease is substantially all removed from this water the disadvantages attending its use for boiler feed purposes, because of the small content of oil, is considered to outweigh the economy effected by its use.

In my Patents Nos. 705,253, 729,775, and 1,056,800, I have described methods and materials for removing such oil and grease from oily water by means of which a substantially complete removal of the oil is effected. The filter and the filtering process of the present invention are adapted particularly for similar oil-removing purposes; but it will be understood that the filter and filtering process can be used for filtering other liquids or gases; for example, may be used for the extraction of oil and grease from steam prior to, or without, condensation of such steam.

In its simplest form the filter of the present invention consists of a bed of carbonaceous material of a particular physical character which I term, because of its source, "flue dust." This flue dust is found, in a particular state of composition and fineness, in the tubes and flues or like passages of fire tube boilers, and practically the same material is found, in practically the same condition, on the tubes and other heating surfaces of water tube boilers; also on the heating surfaces of various other types of furnaces. This material is the material which is commonly removed, from time to time, in the cleaning of the tubes and flues of boiler furnaces. In terming this material "flue dust" I do not of course mean to limit the material by that term to material coming from within boiler flues, but use that term as applicable to the material, from whatever source derived. In general, this material termed by me "flue dust," is made up of discrete particles, partly granular, partly flaky, and partly pulverulent; principally carbonaceous, but with admixed or integrally attached particles of ash, particularly silicious ash; and usually with vesicular particles of carbon or ash distributed throughout the mass. The specific structure of the flue dust will of course vary somewhat with the conditions of operation of the furnaces, as well as with the kind of fuel burned. With anthracite coal the flue dust is made up largely of flaky particles of uneven size and shape with intermixed discrete granular and pulverized particles and ash. With bituminous coal the flaky particles are more irregular and more porous, and the proportion of porous granular particles is usually much larger. Some of these particles resemble coke in appearance but are much more porous and less dense. Others are exceedingly light and porous. It is probable that the flue dust results in part from the deposition in the flues or on the heating surfaces, of fine particles carried along mechanically by the flue gases, and in part from the condensation and deposition in the flues or other heating surfaces of products of distillation or of incomplete combustion. When a fresh bed of fuel is made in the boiler, and particularly with bad stoking and incomplete combustion due to insufficient air, a considerable distillation of the coal takes place, particularly with bituminous coal, and the distilled portions on cooling in or on the tubes or other heating surfaces separate tar or other smoke constituents which thus gradually accumulate and which in the case of the tar may be subsequently converted into a porous condition when the gases passing through or around the flues, or against other heating surfaces, subsequently reach a high temperature. The coke-like, but more porous and open and laminated, nature of the particles of certain bituminous flue dusts would seem to indicate a gradual building up of the particles from deposited smoke particles or condensed tar, with subsequent removal of volatile constituents and conversion of the particles into a hard and solid, but brittle and porous, carbonaceous mass. The appearance of other carbonaceous particles and of ash would seem to indicate that they have been carried along mechanically by the draft and only partly consumed and then deposited on the tubes or other heating surfaces upon decrease in the intensity of the draft or upon cooling. From the great variations in the temperature of the furnace bed and of the flues and flue gases, as well as in the fuel and the stoking and combustion and air control, it necessarily follows that the same furnace may discharge flue gases of widely differing composition even in a short period of time, and that the composition of the flue dust might be expected to be somewhat variable, and of a rather heterogeneous nature. I do not, however, desire to limit myself to any theoretical discussion or explanation of how such flue dust is formed, since the formation thereof is no part of the present invention. I have, however, found that such flue dust has a peculiar structure and composition which renders it particularly valuable for use in oil filters, and for removing oil and grease from oily or greasy water. The porous granular and flaky carbonaceous material, intermixed with particles of silicious ash, has such a selective affinity for oil and grease that when oily or greasy water, such as condenser water, is passed through it, the oil is retained in the filter and the oil-free water is allowed to pass freely. I have found that this material has the surprising property of separating oil and grease, including emulsified oil, and retaining the oil and grease while permitting passage of the water, until saturation of such carbonaceous material with the oil or grease is effected. This carbonaceous material termed "flue dust" is particularly effective in removing the coarser oil particles, known as "rough oil," even in relatively thin layers; and hence it is a valuable filtering material, particularly when combined with layers of other oil-removing materials for subsequently removing the finer oil particles including emulsified oil. The process of the present invention contemplates the use of this flue dust both alone and when combined with other oil-removing layers, and particularly with an acid-neutralizing layer such as serpentine asbestos or magnesium silicate or carbonate, etc. When the flue dust within the filter is saturated with the oil and oil begins to come through, the filter is renewed and the oil-saturated flue dust suitably treated to recover the oil, or burned under the boilers as waste material, or otherwise disposed of. The disposal of this material forms no part of the present invention. The flue dust is itself a waste material so that regeneration and economy in its use are not essential.

The use of the carbonaceous flue dust alone as a filtering material is sometimes objectionable where the water is to be subsequently used in a boiler, since the flue dust often contains sulfur compounds or sulfuric acid in objectionable amounts which make the water acid; this acidity, while advantageous for some purposes, such as for germicidal purposes, is not desired for boiler feed water. Accordingly I filter the water subsequently through an acid-neutralizing filtering material which serves to neutralize the acid. As such a material I have found that serpentine asbestos or magnesium silicate or carbonate, etc., is particularly advantageous because of its selective affinity for oil and its resulting double function of and acidity-neutralizer and an oil remover. It thus becomes possible to use the flue dust as a pre-filter to remove the coarser oil particles and the asbestos for removing the finer oil particles and furthermore for neutralizing the acid in the water. It is thus possible to remove substantially all the oil and obtain a neutral water of a high degree of purity for boiler feed purposes.

The acidity-neutralizing layer, when used, may be made up only of the material which acts as neutralizing and filtering material, or of such material intermixed with sand or pulverized coke, etc., in varying proportions; or, the flue dust and the acid-neutralizing material may be mixed together. Instead of the magnesium silicate, other acidity-neutralizing materials such as magnesium carbonate, dolomite, magnesite, etc., can be used in combination with the flue dust.

The layers of carbonaceous flue dust and of acidity-neutralizing material may conveniently be superposed or arranged in separate layers or in separate filter bodies, or in other suitable arrangement, and the liquid to be filtered caused to pass first through the layer of the flue dust and then through the layer of the neutralizing material. When the flue dust is used alone it will of course be necessary only to pass the liquid through a layer of this material of suitable depth and size.

It will be understood that instead of oily water, other liquids and gases can be similarly filtered according to the present invention. Thus oil can be removed from steam or air or from other liquids, etc. But the invention is of particular value in the filtering of oily water because of its selective attraction for the oil, and because it is a material which is inexpensive to obtain and renew, and presents no problems in its disposal. It is, in fact, almost always obtainable at the very plant where it is to be used, and after use in a filter it may further be used as a fuel because of its combustible nature and its absorbed combustible oil content.

The term "flue dust", as used in the present specification and claims, is used to refer to the carbonaceous dust referred to from boiler and heating furnaces, as distinguished from the metallic dust deposited in the flues of metallurgical furnaces and made up essentially of fine particles of ore. I am aware that such ore dust is sometimes referred to as flue dust, but the term as used in describing the filter and filtering process of the present invention is used to refer to the carbonaceous flue dust made up essentially and principally of particles of carbon admixed with more or less ash, and having the peculiar composition and structure and selective oil removing properties which have been referred to. This material, as has been pointed out, is of a porous nature, is made up of intermixed granular and pulverulent particles, with varying quantities of flaky particles, and with varying amounts of ash particles and of ash contained in or attached to the carbonaceous particles. The ash is partly of a light fluffy structure, partly of vesicular nature and probably also in part distributed throughout the carbonaceous particles.

I am aware that powdered coal, coke, charcoal, etc., have been heretofore proposed as filtering materials, but the carbonaceous flue dust of the present invention has a structure and composition peculiar to itself which distinguishes it from such old forms of carbonaceous filtering material.

In this specification I use the term oil and grease as practically synonymous, the principal difference between oil proper and grease proper, so far as the action of the filter is concerned being a difference of melting point.

What I claim is:—

1. A filter having a filter body of porous granular carbonaceous flue dust.

2. A filter having a filter body of carbonaceous flue dust comprising brittle, porous, granular, flaky and pulverulent carbonaceous particles, intermixed with particles of ash.

3. A composite filter having one filter body comprising carbonaceous flue dust having an acid reaction and another filter body comprising an acid-neutralizing filtering material.

4. A composite filter having one filter body comprising carbonaceous flue dust having selective oil-removing properties, and another filter body comprising serpentine asbestos also having selective oil-removing properties.

5. A composite filter having one filter body comprising carbonaceous flue dust having an acid reaction and another filter body comprising an acid-neutralizing magnesium compound.

6. The process of removing oil from oily water which comprises passing such water through a porous layer of carbonaceous flue dust.

7. The process of removing oil from oily water which comprises passing such water through a porous layer of carbonaceous flue dust comprising intermixed brittle, porous, granular and flaky carbonaceous particles and particles of ash, and having a greater attraction for the oil than the water.

In testimony whereof I have signed this specification in the presence of two subscribing witnesses.

ARTHUR E. KRAUSE.

Witnesses:
CHARLES E. RYND,
H. M. MARBLE.